US006860417B1

United States Patent
Ramos

(12) United States Patent
(10) Patent No.: US 6,860,417 B1
(45) Date of Patent: Mar. 1, 2005

(54) LOW SHOCK WORK TRANSPORT SYSTEM FOR PRESSURE VESSELS

(75) Inventor: Richard Ramos, La Habra, CA (US)

(73) Assignee: SierraTherm Production Furnaces, Inc., Watsonville, CA (US)

( * ) Notice: Subject to any disclaimer, the term of this patent is extended or adjusted under 35 U.S.C. 154(b) by 0 days.

(21) Appl. No.: 10/080,150

(22) Filed: Feb. 19, 2002

(51) Int. Cl.[7] .............................................. B23K 37/04
(52) U.S. Cl. ...................... 228/49.5; 228/47.1; 414/217
(58) Field of Search .............................. 228/49.5, 47.1, 228/221; 414/217, 222.04–222.08, 222.09

(56) References Cited

U.S. PATENT DOCUMENTS

| | | | |
|---|---|---|---|
| 3,631,806 A | * | 1/1972 | Barthalon ..................... 104/89 |
| 3,982,887 A | | 9/1976 | Kendziora et al. |
| 4,141,458 A | * | 2/1979 | Brooks et al. .......... 414/331.18 |
| 4,518,078 A | * | 5/1985 | Garrett ....................... 198/775 |
| 5,031,818 A | | 7/1991 | Gieskes |
| 5,214,290 A | * | 5/1993 | Sakai ....................... 250/492.2 |
| 5,480,127 A | * | 1/1996 | Choudhury et al. ........ 266/143 |
| 5,573,174 A | * | 11/1996 | Pekol .......................... 228/219 |
| 5,802,993 A | * | 9/1998 | Meador ....................... 110/345 |
| 5,909,994 A | * | 6/1999 | Blum et al. ................. 414/217 |

FOREIGN PATENT DOCUMENTS

DE G8520254.1 12/1985

OTHER PUBLICATIONS

Paul W. Barnes, "Sealing MEMS Devices in Ceramic Packages in a High Vacuum Atmosphere," SST International Technical Bulletin.

* cited by examiner

Primary Examiner—Lynne R. Edmondson
(74) Attorney, Agent, or Firm—Blakely Sokoloff Taylor & Zafman LLP

(57) ABSTRACT

A low shock work transport system for moving workpieces into a pressure vessel without significant vibrations or mechanical shocks. The pressure vessel has two opposing ends with a sealable port in each of the opposing ends. A vessel rail is contained entirely within the pressure vessel with the two ends of the rail adjacent the ends of the pressure vessel. A movable rail is adjacent each end of the pressure vessel. Each movable rail is movable between a first position in which one end of the movable rail is within the pressure vessel and contiguous with the adjacent end of the vessel rail, and a second position in which the one end of the movable rail is outside the pressure vessel such that the sealable ports can be sealed. The workpieces are moved by sliding them over the upper surfaces of the rails.

10 Claims, 5 Drawing Sheets

LOW SHOCK WORK TRANSPORT SYSTEM FOR PRESSURE VESSELS

BACKGROUND OF THE INVENTION

A soldered connection may be created by assembling the parts to be joined with a solder preform, heating the assembly to a temperature where the solder preform melts, and then allowing the assembly to cool. This process is generally termed reflow soldering.

As in all soldering processes, it is important that the solder and the parts to be joined be free of oxidation that inhibits wetting of the parts by the molten solder and creates defects, such as voids and inclusions in the soldered joint. Typically a chemically active flux is used to remove and prevent oxidation of the molten solder. After soldering, the residual flux leaves a corrosive residue that should be removed to provide increased reliability of the assembly.

It is desirable to be able to perform soldering operations without the need for flux because of the possibility of residual corrosive contamination. This is particularly desirable for electronic assemblies, especially microelectronic assemblies. In microelectronic assemblies soldered joints may be made on or in close proximity to delicate structures such as bonding wires. Semiconductor chips may be soldered directly to substrates.

It is known that soldering in an oxygen-free atmosphere can eliminate the need for flux. One method for providing an oxygen-free atmosphere is to provide an inert or reducing gas around the parts to be joined. Another method is to perform the soldering operation under a high vacuum. The reflow soldering process is particularly suitable for use in a vacuum because it is not necessary to physically manipulate the parts during the soldering operation.

To carry out reflow soldering under a vacuum, the parts may be placed in a pressure vessel that includes a heating element to form a furnace. The pressure vessel furnace is then evacuated and the parts heated to form the soldered connection. U.S. Pat. No. 3, 982,887 to Kendziora et al. shows a pressure vessel furnace for flux-free soldering. The Kendziora furnace uses a series of belt and roller conveyors to move the workpieces into and through the furnace. This provides a satisfactory device for workpieces of substantial size, particularly where some mechanical arrangement holds the parts in position prior to the formation of the soldered connection, so that the vibration and jostling inherent in the conveyor mechanism does not displace the parts prior to soldering. In particular, there is a discontinuity in the conveyor system to permit gates to seal the furnace for evacuation. This discontinuity is likely to create a particulary large mechanical shock to the parts as they enter the furnace. This makes the Kendziora furnace unsuitable for processing microelectronic assemblies where a slight vibration or shock can displace the unconnected parts sufficiently to produce a defective assembly.

SUMMARY OF THE INVENTION

A low shock work transport system for moving workpieces into a pressure vessel without significant vibrations or mechanical shocks. The pressure vessel has two opposing ends with a sealable port in each of the opposing ends. A vessel rail is contained entirely within the pressure vessel with the two ends of the rail adjacent the ends of the pressure vessel. A movable rail is adjacent each end of the pressure vessel. Each movable rail is movable between a first position in which one end of the movable rail is within the pressure vessel and contiguous with the adjacent end of the vessel rail, and a second position in which the one end of the movable rail is outside the pressure vessel such that the sealable ports can be sealed. The workpieces are moved by sliding them over the upper surfaces of the rails.

DETAILED DESCRIPTION OF THE INVENTION

The present invention provides a low shock work transport system that transports workpieces, such as unconnected assemblies of parts and solder preforms, into a pressure vessel, such as a pressure-tight reflow furnace, without significant vibrations or mechanical shocks.

Figure 1:
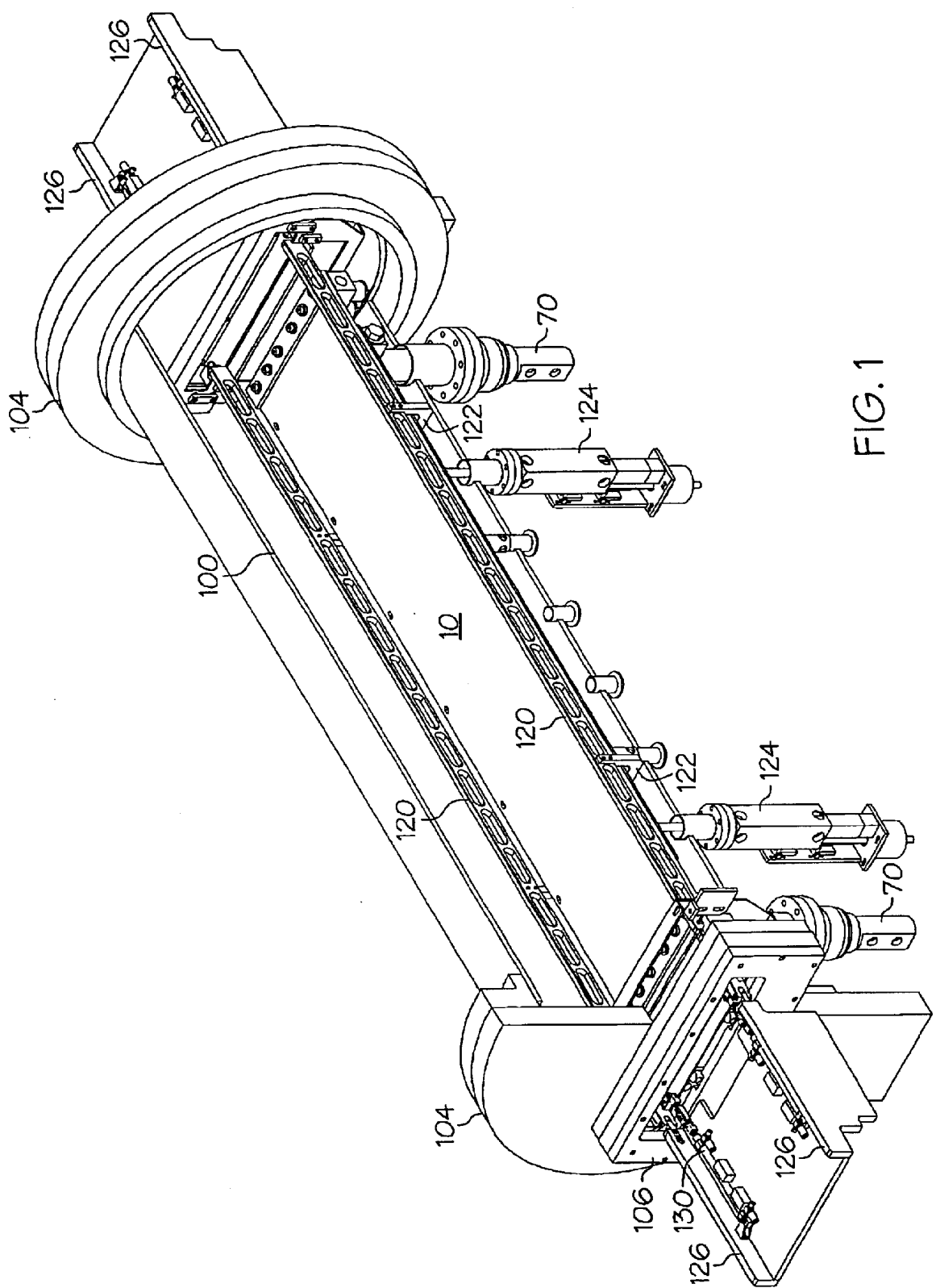
FIG. 1 is a pictorial view of an embodiment of a work transport system according to the present invention in a cut-away pressure vessel.

FIG. 1 shows an embodiment of the present invention with a pressure vessel furnace. The pressure vessel includes a cylindrical wall 100 closed at the ends by two plates 104. The front half of the wall 100 and the left plate 104 have been cut away to allow the structure of the present invention inside the pressure vessel to be seen. An electrical heating element 10 is provided inside the pressure vessel to form a pressure-tight furnace. The heating element may be in the form of an electrically resistive plate such as a sheet of graphite. Two electrodes 70 pass through the wall of the vessel with an electrically isolated pressure-tight seal at the wall to provide electrical current to the heating element 10. A gate valve 106 is provided in each of the plates 104 to provide a port for moving workpieces into and out of the pressure vessel. The present invention is not restricted to use with any particular type or configuration of pressure vessel. It will be appreciated that the pressure vessel shown as part of the pressure-tight furnace is but one example of pressure vessels that could be used with the present invention. While the invention is described as applied to a pressure-tight furnace, it will be appreciated that the invention is applicable to other applications that require a work transport system for moving workpieces through a pressure vessel without significant vibration or shock.

Figure 2:
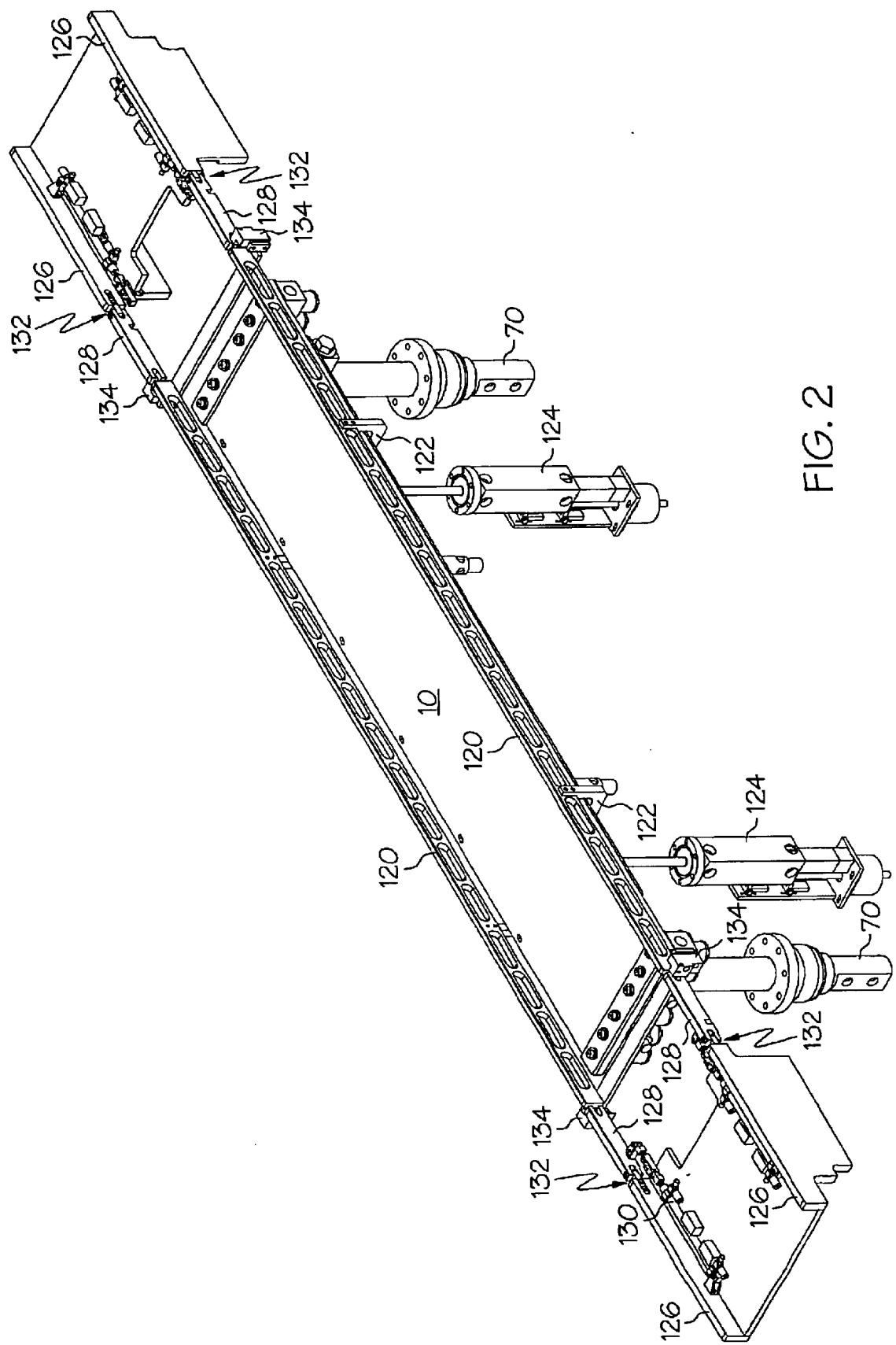
FIG. 2 is a pictorial view of the embodiment of a work transport system of FIG. 1 without the pressure vessel.

As may be seen in FIGS. 1 and 2, the present invention provides a pair of rails that pass through the pressure vessel and extend from both ends. Each of the two rails may include a number of sections. In the embodiment shown, each rail includes a vessel rail 120, movable rails 128, and loading rails 126. The rails provide a substantially smooth and straight upper surface for loading workpieces into the pressure vessel. The workpieces are moved by sliding them over the upper surfaces of the rails. The workpiece may be a "boat" which is a tool used to carry one or more assemblies for reflow soldering.

Boats are loaded into the pressure vessel by placing a boat on the loading rails 126 at one end of the pressure vessel. The boat is then pushed over the movable rails 128 onto the vessel rails 120. Successive boats are loaded into the pressure vessel thereby pushing previously loaded boats further into the pressure vessel. The pusher mechanism is only required to push the rear edge of the boat into the pressure vessel a short distance because the successive loading of additional boats is used to push the previously loaded boats for the majority of the length of the pressure vessel.

The boats can be loaded with little vibration and mechanical shock because the rails provide a substantially flat upper surface to support the boats as they are moved. The forward bottom edges of the boats may be chamfered so that they can pass over small irregularities in the upper surface of the rails with minimal mechanical disturbance to the assemblies being carried. The use of boats may allow parts and solder preforms to be assembled at a workstation and transferred to the pressure vessel in batches for reflow soldering. The boats may be made from plates of graphite. An exemplary graphite boat has a body that is approximately 8 by 10 by ¼ inches. An exemplary pressure vessel may have a length of about 57 inches and may accommodate six of the exemplary boats for processing.

When the pressure vessel has been fully loaded, the movable rails 128 may be retracted to allow the gate valves 106 to be closed in preparation for evacuation, pressurization, or replacement of the atmosphere within the pressure vessel. In the embodiment shown in FIG. 3, each of the movable rails 128 is joined by a hinge 132 to the adjacent loading rail 126. This allows each movable rail 128 to be folded at approximately a right angle to the adjacent loading rail 126 toward a point midway between the two hinges 132 joining the movable rails to the loading rails at each end. An actuator 130 may be used to move the movable rails between extended and retracted positions. In this embodiment, each movable rail 128 has a length that is slightly less than one-half the distance between the rails. The length of each movable rail is such that, when in the retracted position, the gate valves 106 (FIG. 1) may be closed. An alignment block 134 may be provided to align the free end of the movable rail 128 with the adjacent end of the vessel rail 120. The alignment block may also provide support for the free end of the movable rail 128. Thus the alignment block 134 may help to provide an upper rail surface that is substantially flat and straight when the movable rail 128 is in the extended position. The alignment block 134 may be supported by the vessel structure (not shown).

If the furnace is operated at high vacuum, the absence of any significant number of gas particles in the furnace makes it impractical to heat the assemblies by radiation or convection from the heating element 10. It may be advantageous to place the boats in direct contact with the heating element 10 to heat the assemblies by conduction. The vessel rails 120 may be supported by a lift mechanism so the vessel rails can be moved from a loading position to a heating position. In the loading position the upper surfaces of the vessel rails 120, which support the boats, are coplanar with the upper surfaces of the movable rails 128 and the loading rails 126. In the heating position, the vessel rails 120 are lowered so that the upper surfaces of the vessel rails are below the upper surface of the heating element 10 as may be seen in FIG. 3. The alignment block may provide a stop for an adjacent end of the vessel rail 120 as it moves from the heating position to the loading position. This helps establish an upper rail surface that is substantially flat and straight when the vessel rails 120 are in the loading position.

The two vessel rails 120 may be joined by brackets 122 that pass under the heating element 10. The brackets 122 may be formed and connected to the vessel rails 120 such that the vessel rails can be raised to the loading position without interfering with the heating element 10. Lift actuators may be connected to the support brackets 122 to move the vessel rails 120 and support brackets 122 between the loading position and the heating position. It will be appreciated that it is desirable that there be no lubricated parts inside the furnace and that all seals be capable of withstanding very high temperatures. In the embodiment shown, the lift actuator 124 provides the only moving mechanism that remains inside the furnace when it is sealed. The lift actuator 124 may be a magnetically coupled mechanism wherein the actuator includes only an unlubricated portion of the mechanism on the inside of the furnace. The remainder of the lift actuator mechanism may be on the outside of the furnace. The coupling of the inside and outside portions of the lift actuator 124 may be magnetic so that no sealing of moving parts is required.

Figure 3:
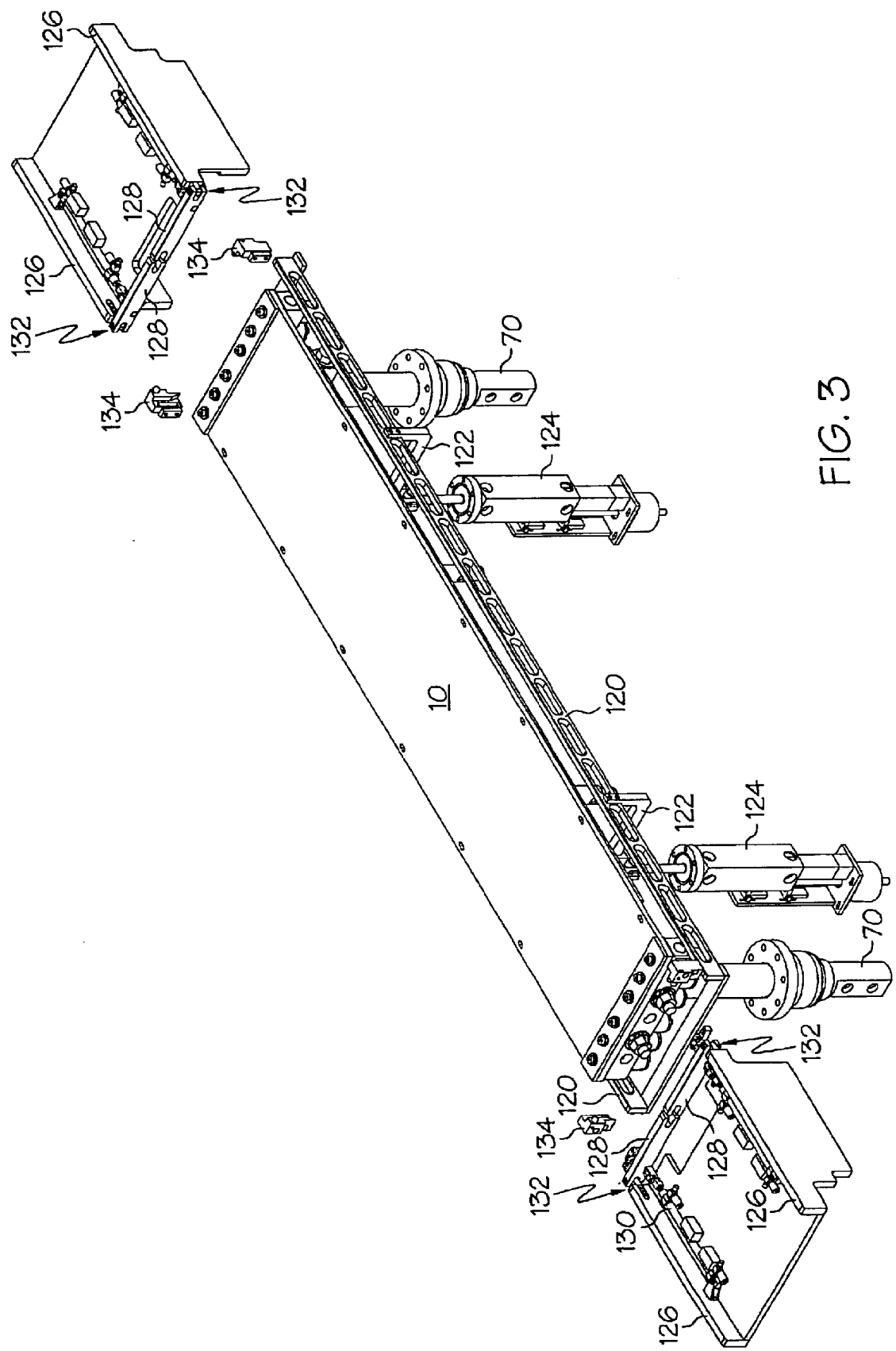
FIG. 3 is a pictorial view of the embodiment of a work transport system of FIG. 2 in a second operative position.
Figure 4:
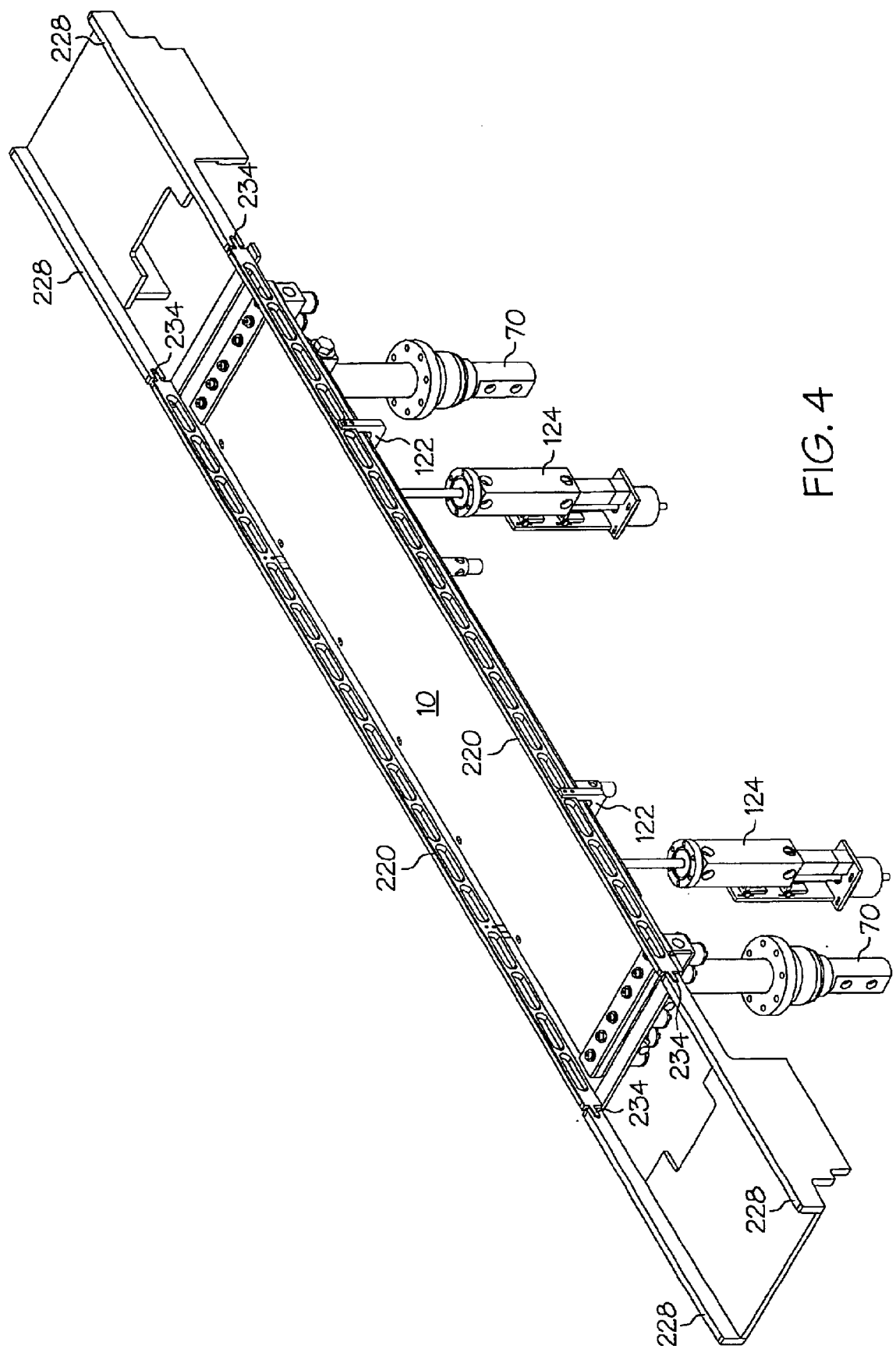
FIG. 4 is a pictorial view of another embodiment of a work transport system according to the present invention.
Figure 5:
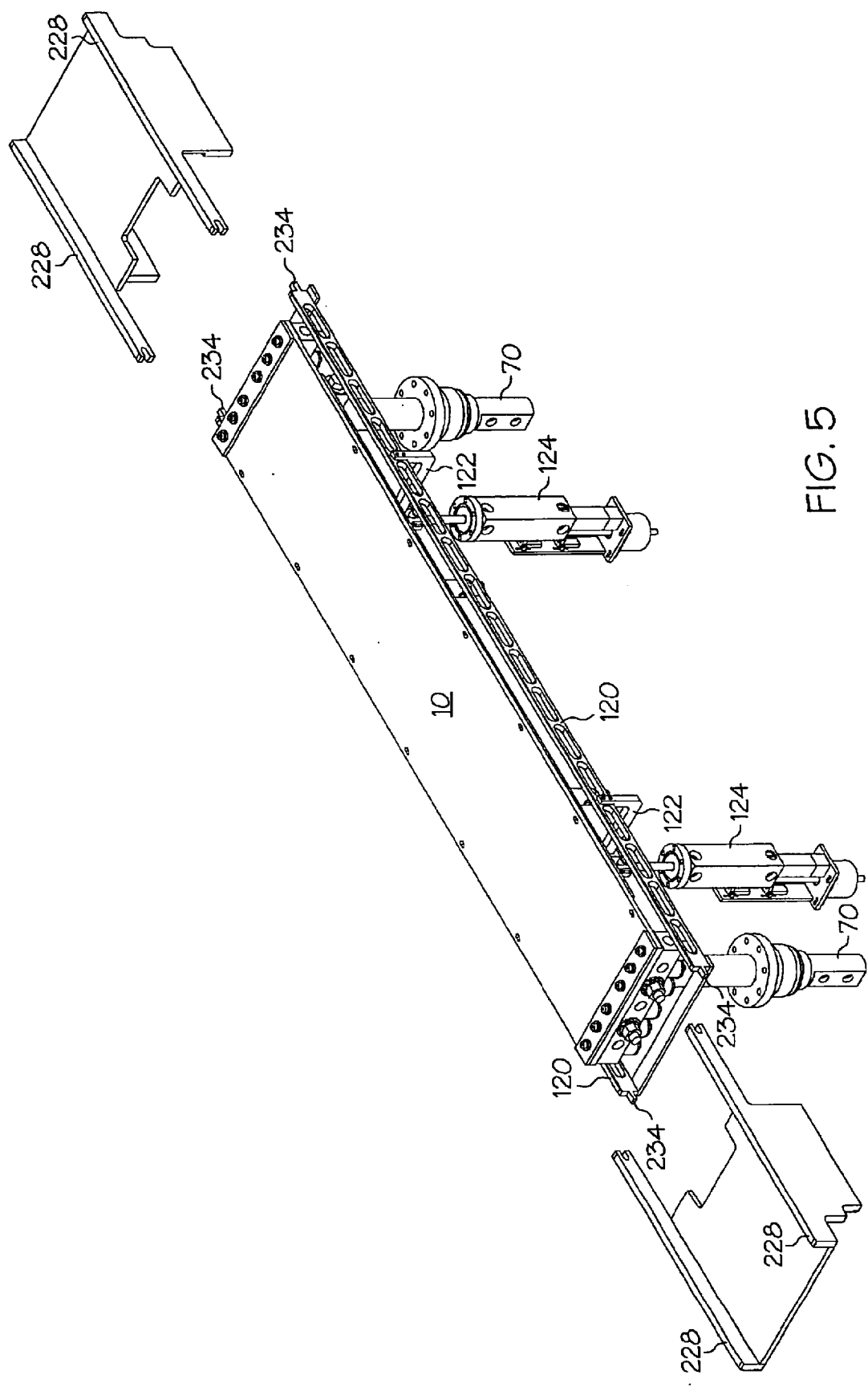
FIG. 5 is a pictorial view of the embodiment of a work transport system of FIG. 4 in a second operative position.

In an alternate embodiment of the invention shown in FIGS. 4 and 5, a single set of movable rails 228 provides the functions of the loading rails 126 and the movable rails 128 of the embodiment shown in FIGS. 2 and 3. In the alternate embodiment, the movable rails move in the direction of the length of the rails. FIG. 4 shows the movable rails 228 in the extended position. The ends of the movable rails 228 and the vessel rails 220 that are adjacent in the loading position may include a structure such as a pin and slot to help provide an upper rail surface that is substantially flat and straight when the movable rail 128 is in the loading position. FIG. 5 shows the movable rails 228 in the retracted position. The movable rails 228 may be moved outwardly away from the vessel rails 220 and the pressure vessel in the direction of the length of the movable rails by a distance sufficient to allow the pressure vessel to be sealed. It will be appreciated that other structures and mechanisms may be used to provide movable rails that can be moved between an extended position where workpieces can be loaded by sliding on the rails and a retracted position where the ports on the ends of the pressure vessel can be sealed.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A device, comprising:
   a pressure vessel having a first end and an opposing second end;
   a port in each of the opposing ends of the pressure vessel;
   a vessel rail contained entirely within the pressure vessel, the vessel rail having
   a first end adjacent the first end of the pressure vessel,
   an opposing second end adjacent the second end of the pressure vessel, and
   an upper surface with a length extending from the first end of the vessel rail to the second end of the vessel rail,
   the vessel rail being movable perpendicular to the length between a first position and a second position;
   a movable rail disposed adjacent each of the opposing ends of the pressure vessel, the movable rail having a first end and an opposing second end, the first end of the movable rail being movable between a first position in which the first end of the movable rail is within the pressure vessel and contiguous with the first end of the vessel rail, and a second position in which the first end of the movable rail is outside the pressure vessel; and a heating element located within the pressure vessel between the first and second ends of the vessel rail such that the upper surface of the vessel rail is above the heating element when the vessel rail is in the first position and below an upper surface of the heating element when the vessel rail is in the second position.

2. The device of claim 1, wherein the second ends of each of the movable rails is outside the pressure vessel and the device further comprises a loading rail with a hinged connection to the second ends of each of the movable rails such that each movable rail can fold at approximately a right angle to the connected loading rail to move to the second position.

3. The device of claim 1, wherein the movable rail moves from the first position to the second position by moving away from the vessel rail in a direction of the length of the movable rail.

4. A device, comprising:

a vessel means for providing a pressure-tight chamber;

port means for allowing workpieces to move into and out of the vessel means;

a heating moms for heating the workpieces;

a first rail means for supporting the workpieces being moved into the vessel means above the heating means, and for lowering the workpieces onto the heating means by movement of the first rail means below an upper surface of the heating means, the first rail means being contained entirely within the vessel means;

a second rail means for supporting the workpieces being moved into the pressure vessel, the second rail means being movable between a first position in which the first and second rail means provide a substantially smooth and straight upper surface and a second position in which the port means can be sealed.

5. The device of claim 4, further comprising a third rail means for supporting the workpieces being moved into the pressure vessel, the third rail means being located entirely outside the vessel means.

6. A device, comprising:

a pressure vessel having a first end and an opposing second end;

a port in each of the opposing ends of the pressure vessel;

a pair of parallel vessel rails contained entirely within the pressure vessel, each vessel rail having a first end adjacent the first end of the pressure vessel and an opposing second end adjacent the second end of the pressure vessel, each vessel rail having an upper surface with a length extending from the first end of the vessel rails to the second end of the vessel rails, the vessel rails being movable perendicular to the lengths between a first position and a second position, two pairs of movable rails disposed adjacent each of the opposing ends of the pressure vessel, each movable rail having a first end and an opposing second end, the first end of each movable rail being movable between a first position in which the first end of the movable rail is within the pressure vessel and contiguous with an adjacent end of the vessel rail and a second position in which the first end of the movable rail is outside the pressure vessel; and a heating element located within the pressure vessel between the vessel rails such that the upper surfaces of the vessel rails are above the heating element when the vessel rails are in the first position and below an upper surface of the heating element when the vessel rails are in the second position.

7. The device of claim 6, wherein the second ends of each of the movable rails is outside the pressure vessel and the furnace further comprises two pairs of loading rails, each loading rail having a hinged connection to the second end of the adjacent movable rail such that each movable rail can fold at approximately a right angle to the connected loading rail to move to the second position.

8. The device of claim 6, wherein each of the movable rails moves from the first position to the second position by moving away from the vessel rails in a direction of the length of the movable rail.

9. The device of claim 6, wherein each of the ports is a sealable port that can be sealed when the adjacent pair of movable rails is in the second position.

10. The device of claim 1, wherein each of the ports is a sealable port that can be sealed when the adjacent movable rail is in the second position.

* * * * *